Patented May 30, 1933

1,911,580

UNITED STATES PATENT OFFICE

WILHELM MEISER AND WILHELM GEISEL, OF LUDWIGSHAFEN-ON-THE-RHINE, AND WALTER von KNILLING, OF MANNHEIM, GERMANY, ASSIGNORS TO I. G. FARBENINDUSTRIE AKTIENGESELLSCHAFT, OF FRANKFORT-ON-THE-MAIN, GERMANY

PRODUCTION OF A CALCIUM NITRATE-UREA DOUBLE COMPOUND

No Drawing. Application filed January 3, 1930, Serial No. 418,424, and in Germany January 26, 1929.

The present invention relates to the production of a calcium nitrate-urea double compound.

The double salt of urea and calcium nitrate $$(Ca(NO_3)_2 + 4NH_2.CO.NH_2)$$

is prepared by introducing urea into a concentrated solution, for example a 75 per cent solution of calcium nitrate and spraying the hot mixture so obtained. In order to increase the capacity of this product for being scattered and for storage it is usually subjected to a subsequent drying treatment. This subsequent treatment is necessary in all cases when the theoretical proportions of the mixture necessary for the formation of the double salt have not been accurately maintained.

We have now found that the production of calcium nitrate-urea double compounds can be carried out with particular advantage when the calcium nitrate solution, after introducing the urea and mixing the two compounds, but before spraying, is evaporated as far as possible, at least until the water content is about 5 per cent or less. Because a concentration takes place before spraying, there is no need to start from highly concentrated solutions of the initial materials.

Although the melting point of mixtures of urea and calcium nitrate which are very poor in water is very high, as a rule between 130° and 150° centigrade, and is therefore at temperatures at which urea alone in the presence or absence of water quickly decomposes partly with the formation of ammonia and carbon dioxide, partly with the formation of ammonia, biuret and cyanuric acid, no decomposition or practically no decomposition of the urea takes place when evaporating the concentrated solution of urea and calcium nitrate up to the complete or almost complete removal of the water. The amount of calcium carbonate which separates out is negligible and the content of biuret after heating the solution of urea and calcium nitrate at 150° centigrade for a period of several hours amounts to from 1 to 2 per cent at the most. In contrast thereto, urea when heated alone to its melting point (133° centigrade) forms 10 per cent and more of biuret and cyanuric acid even after a few minutes. By the process according to the present invention it is not necessary accurately to maintain the theoretical proportions of the two components necessary for the formation of the double salt, but, in so far as the water can be removed to a sufficiently great extent by evaporation the one or the other of the components may be employed in a large excess and yet mixtures which can be sprayed, which solidify rapidly and which are capable of being scattered are obtained. As a rule the amount of urea will vary between 2 and 7 molecular proportions for each molecular proportion of calcium nitrate.

The process according to the present invention also has the advantage that an evaporation of water or drying of the salt after spraying may be dispensed with and a globular product with a smooth surface is obtained which is particularly well suited for scattering.

The following examples will further illustrate the nature of this invention but the invention is not restricted to these examples.

*Example 1*

240 kilograms (4 molecular proportions) of urea in the solid or dissolved form are introduced into a solution of 164 kilograms of calcium nitrate (1 molecular proportion) in 200 kilograms of water and the mass is then evaporated in vacuo until the water content only amounts to from 0 to 2 per cent. In order to maintain the mixture in the fused state it is necessary to regulate the reduced pressure so that the boiling point does not fall below the melting point which gradually rises to about 150° centigrade. The melt is then sprayed by means of nozzles with the employment of compressed air, or it is dispersed into droplets which rapidly solidify by allowing it to run into a stream of air or by means of rotating discs or by centrifuging. The composition of the product obtained corresponds to the double salt

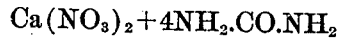

and the biuret content amounts to less than 2 per cent.

*Example 2*

A solution of 328 kilograms (2 molecular proportions) of calcium nitrate and 240 kilograms (4 molecular proportions) of urea in about 400 kilograms of water is evaporated in vacuo until it has a water content of about 1 per cent. For this purpose it is only necessary to heat to about 112° centigrade since the melting point of this mixture is considerably lower than that of the pure double salt. The mass is then sprayed as described in Example 1. The product obtained, which mainly possesses a globular form, contains 1 molecular proportion of

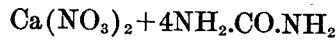

to each molecular proportion of $Ca(NO_3)_2$ and about 0.7 per cent of water. It is free from biuret.

*Example 3*

A solution of 164 kilograms (1 molecular proportion) of calcium nitrate and 360 kilograms (6 molecular proportions) of urea in about 250 kilograms of water is evaporated in vacuo until the water content is about 2 per cent. In this case the setting point is also lower than that of the pure double salt so that it is only necessary to employ a temperature of about 110° centigrade. The mass is then mechanically sprayed in any known or suitable manner. The granules obtained, which are mostly globular contain about 1 per cent of water and two molecular proportions of free urea to each molecular proportion of the double salt. The product has a good capacity for being scattered and stored, and a subsequent drying is not necessary. The content of biuret amounts to about from 1 to 2 per cent.

What we claim is:—

1. The process of producing calcium nitrate-urea double compounds which comprises incorporating urea with a dilute calcium nitrate solution, evaporating the water at least until the water content of the mixture is reduced to about 5 per cent, and solidifying the mass by spraying.

2. The process of producing calcium nitrate-urea double compounds which comprises incorporating from 2 to 6 molecular proportions of urea with a dilute solution of one molecular proportion of calcium nitrate, evaporating the water at least until the water content of the mixture is reduced to about 5 per cent, and solidifying the mass by spraying.

3. The process of producing calcium nitrate-urea double compounds which comprises incorporating about 4 molecular proportions of urea with a dilute solution of one molecular proportion of calcium nitrate, evaporating the water at least until the water content of the mixture is reduced to about 5 per cent, and solidifying the mass by spraying.

4. The process of producing calcium nitrate-urea double compounds which comprises incorporating urea with a dilute calcium nitrate solution, evaporating the water in vacuo at least until the water content of the mixture is reduced to about 5 per cent and solidifying the mass by spraying.

5. The process of producing calcium nitrate-urea double compounds which comprises incorporating about four molecular proportions of urea with a dilute solution of one molecular proportion of calcium nitrate, evaporating the water in vacuo at least until the water content of the mixture is reduced to about 5 per cent and solidifying the mass by spraying.

6. The process of producing calcium nitrate-urea double compounds which comprises incorporating urea with a dilute calcium nitrate solution, evaporating the water in vacuo at a temperature up to about 150° C. at least until the water content of the mixture is reduced to about 5 per cent and solidifying the mass by spraying.

7. The process of producing calcium nitrate-urea double compounds which comprises incorporating about four molecular proportions of urea with a dilute solution of one molecular proportion of calcium nitrate, evaporating the water in vacuo at a temperature up to about 150° C. a least until the water content of the mixture is reduced to about 5 per cent and solidifying the mass by spraying.

In testimony whereof we have hereunto set our hands.

WILHELM MEISER.
WILHELM GEISEL.
WALTER von KNILLING.